United States Patent [19]

Tseng

[11] Patent Number: 5,282,621
[45] Date of Patent: Feb. 1, 1994

[54] UNIVERSAL CONVERTER FOR NON-EXCLUSIVE CARDS OF VIDEO GAME

[76] Inventor: Ching J. Tseng, No. 13-2, Lane 778, Hua Cheng Rd., Hsin Chuang City, Taipei Hsien, Taiwan

[21] Appl. No.: 981,098
[22] Filed: Nov. 24, 1992
[51] Int. Cl.⁵ .............................................. A63F 9/22
[52] U.S. Cl. .................................. 273/148 B; 273/435
[58] Field of Search ........ 273/433, 434, 435, DIG. 28, 273/85 G, 148 B

[56] References Cited

U.S. PATENT DOCUMENTS

| | | | |
|---|---|---|---|
| 4,480,835 | 11/1984 | Williams | 273/148 B |
| 4,596,390 | 6/1986 | Studley | 273/148 B |
| 4,844,465 | 7/1989 | Hibino et al. | 273/148 B |
| 5,004,232 | 4/1991 | Wong et al. | 273/435 |
| 5,112,051 | 5/1992 | Darling et al. | 273/148 B |
| 5,203,848 | 4/1993 | Wang | 273/435 |

Primary Examiner—Jessica J. Harrison
Attorney, Agent, or Firm—Morton J. Rosenberg; David I. Klein

[57] ABSTRACT

A universal converter for non-exclusive cards of video game includes a first slot device for receiving a code-including video game card, a second slot device for receiving a general video game card, and an interconnecting device for coupling between the first slot device and the second slot device. The general video game card can not be played in a specific main machine because it lacks some secret code to turn on the main machine, while the code-including video game card is allowed to be played in the main machine. The universal converter for non-exclusive cards of video game receives both the code-including video game card and a general video game card enabling the general video game card to be played in the main machine.

3 Claims, 4 Drawing Sheets

UNIVERSAL CONVERTER FOR NON-EXCLUSIVE CARDS OF VIDEO GAME

The present invention relates to a universal converter for non-exclusive video game cards of video game, especially for one which can be matched between a Nintendo TM video game main machine and non-Nintendo's video game cards.

Video games are a very popular entertainment at the present time. Many people buy video games which include a main machine and a plurality of video game cards. However, some companies try to dominate the market by adding a secret code lock in the main machine to prevent a user playing video game cards of other companies in a same main machine. The video game cards manufactured by the same company contain some special secret codes or triggering signals to "turn on" (release) the main machine. Therefore, only game cards with the triggering signals can turn on the main machine. This strategy enables the manufacturers to monopolize both the hardware and software of the video game market. However, general users have to buy different main machines for playing different video game cards manufactured by different companies. The most popular video game is Nintendo TM company which holds a very large market share in the world. Many people buy the main machine of Nintendo TM. However, the Nintendo TM main machine can only play Nintendo TM video game cards and excludes all other video game cards.

It is the purpose of the present invention, therefore, to mitigate and/or obviate the above-mentioned drawbacks in the manner set forth in the detailed description of the preferred embodiment.

A universal converter for non-exclusive video game cards of video game according to the present invention, includes a first slot means for receiving a code-including video game card, a second slot means for receiving a general video game card, and an interconnecting means for coupling the first slot means to the second slot means thus allowing the general video game card to be played on a machine which previously only allowed the code-including video game card to be played therein.

An object of the present invention is to provide a universal converter for non-exclusive video game cards of video games which can utilize the code-including video game card to turn on the main machine, thereby allowing any general video game card to be played in a specific main machine.

These and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENT

Figure 1:
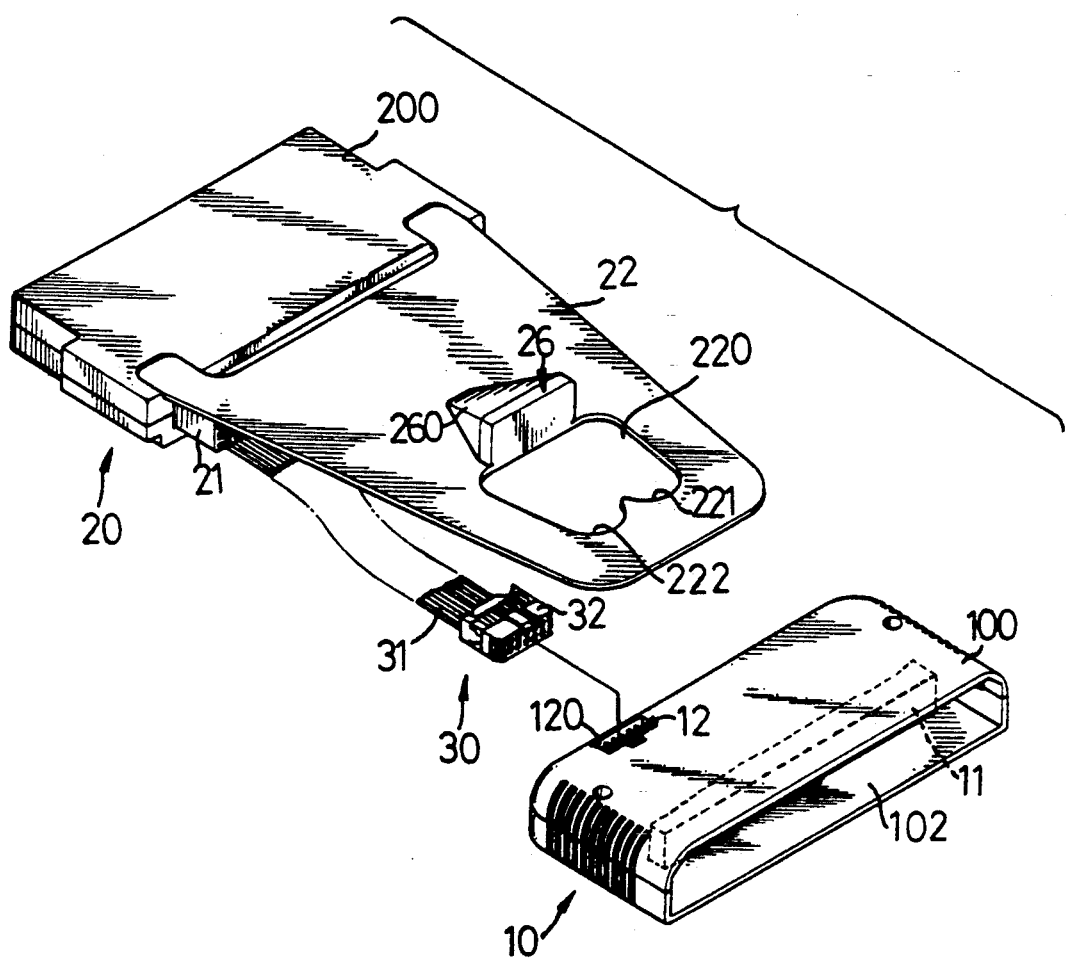
FIG. 1 is an exploded view of a universal converter for non-exclusive video game cards of video game in accordance with the present invention including a first slot means, a second slot means, and an interconnecting means connected therebetween.
Figure 2:
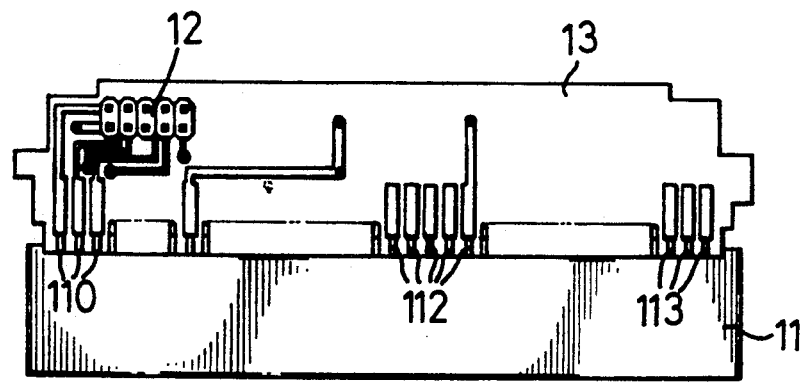
FIG. 2 is a detailed inner view of the first slot means of FIG. 1.
Figure 5:
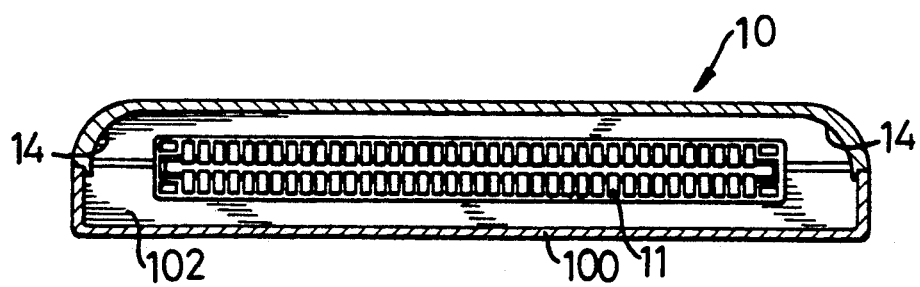
FIG. 5 is a front view of the first slot means of the converter cf FIG. 1.
Figure 4:
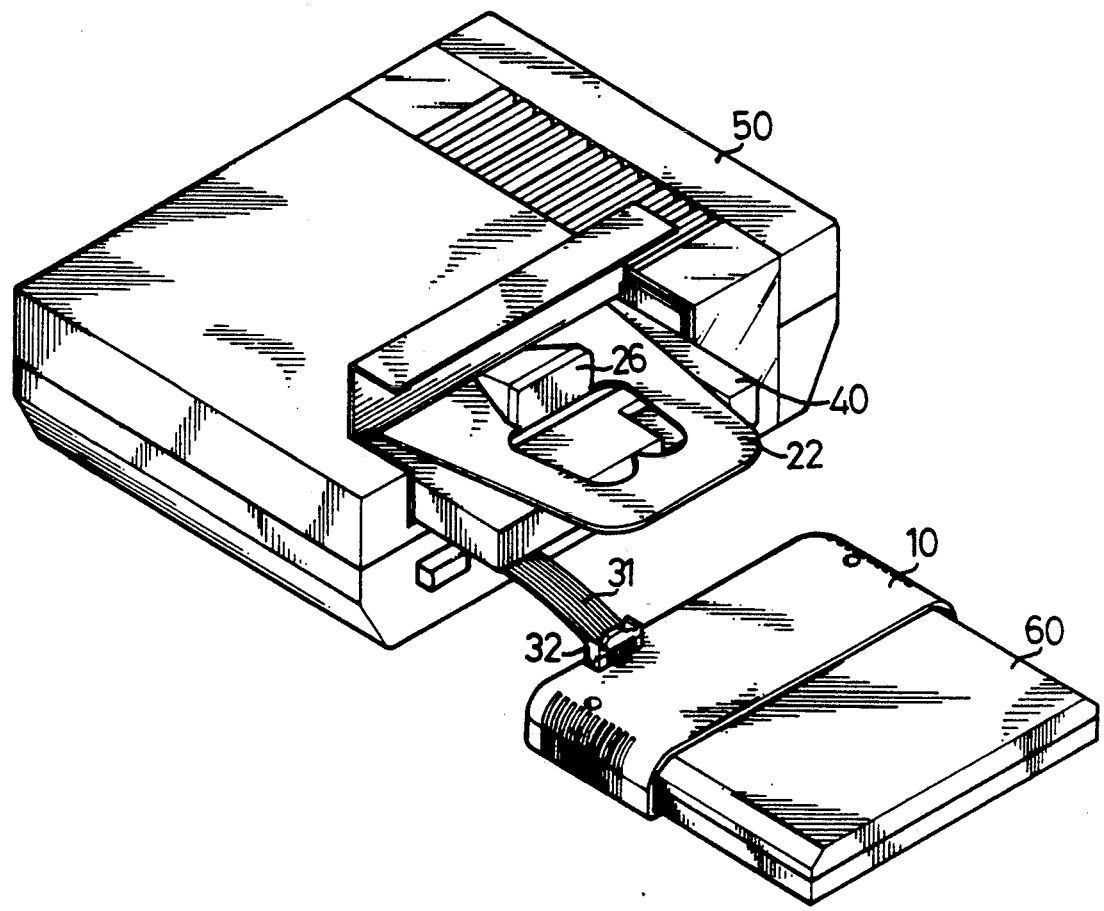
FIG. 4 illustrates a general video game card inserted in the second slot means, a code-including video game card inserted in the first slot means, and the converter inserted in a main machine.
Figure 6:
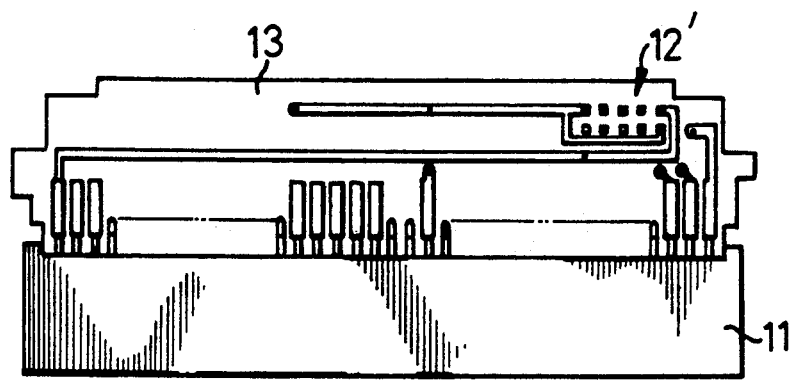
FIG. 6 is an opposite view of the dual side circuit board of FIG. 2.

Referring to FIGS. 1 and 4, a universal converter for non-exclusive video game cards of video game comprises a first slot means 10 for receiving a code-including video game card 60, a second slot means 20 for receiving a general video game card 40, and an interconnecting means 30 for coupling between the first slot means 10 and the second slot means 20. The first slot means 10 comprises a first casing body 100 having a slot 102 in a front side thereof. A first card socket 11 having a plurality of isolated pin holes for receiving a plurality of conducting leads printed on a first circuit board 13 (see FIGS. 2 and 6) of the code-including video game card 60 is installed inside the first casing body 100 and exposed to outside periphery through the slot 102. The video game card 60 is used in a specific main machine 50 such as a Nintendo's main machine. Normally the specific main machine 50 can only play the code-including video game card 60 excluding other general video game cards 40 because the former contains a secret code for turning on the main machine 50. A first male socket 12 is physically and electrically connected to the first circuit board 13 having a plurality of pins, each of which is electrically connected to a specific pin hole of the first card socket 11 via the first circuit board 13. The detailed electrical connection between the first card socket 11 and the first male socket 12 is shown in FIGS. 2 and 6, where FIG. 6 is the rear view of the components as seen in FIG. 2. FIG. 5 illustrates the detailed front view of the first card socket 11.

Referring to FIGS. 2, 4, and 5, the first circuit board 13 is attached at the rear of the pin socket 11. The first male socket 12 is installed on the printed circuit board 13 and electrically connected to a plurality of first leads 110. The plurality of first leads 110 on the first circuit board 13 are connected to the corresponding output terminals from the specific code-including card 60, such that the triggering signals from the code-including card 60 are transmitted to the first male socket 12. A plurality of second leads 112 and third leads 113 printed on the circuit board 13 are also connected to corresponding pins of the pin socket 11 for further engaging the pin socket 11 to the circuit board 13.

Referring to FIG. 1 again, the second slot means 20 comprises a second casing body 200 having a front opening (not shown) and a rear opening (not shown), an operating plate 22 fixed on the second casing body 200 just above the first opening, a second card socket 21 installed in the second casing body 200 and extending outward from the front opening for receiving a general video game card 40 (see FIG. 4). A third opening 220 is formed near the front side of the operating plate 22 having a right recess 221 and a left recess 222 allowing a user to pull the operating plate 22 by his fingers such as index-finger and middle finger. A block 26 protruding from the operating plate 22 just behind the third opening 220 allows the user to operate (push) by a finger, such as thumb. Therefore the third opening 220 together with the block 26 allows the user to insert the second slot means 20 to a main machine 50 (see FIG. 4) and allows him to pull out the second slot means 20 therefrom. More over, a slant face 260 is formed on the block 26 for preventing the second slot means 20 inserting too far into the main machine 50 and destroying the structure therein. The inner structure of the second card socket 21 is shown in FIG. 3.

Figure 3:
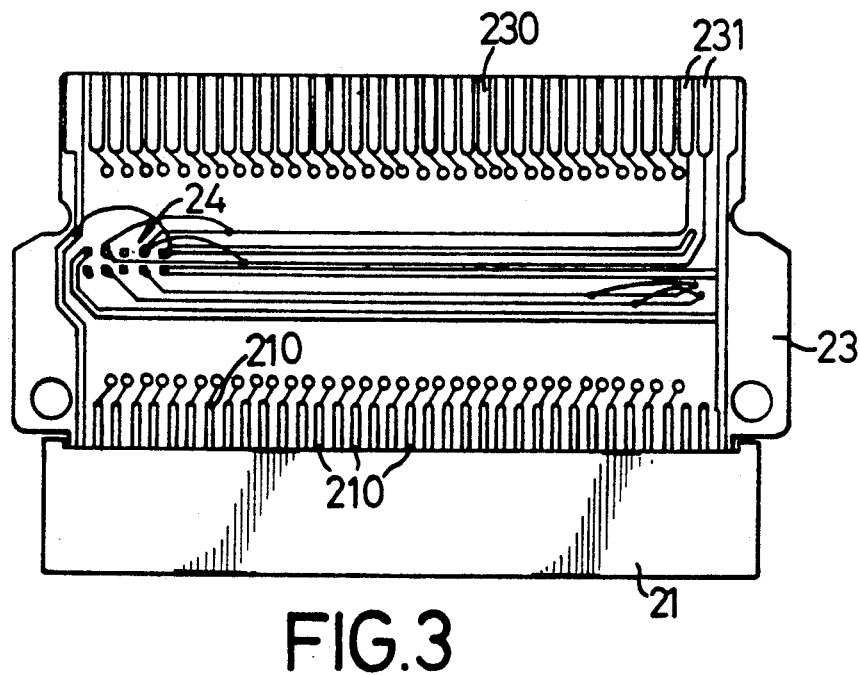
FIG. 3 is a detailed inner view of the second slot means of FIG. 1.
Figure 7:
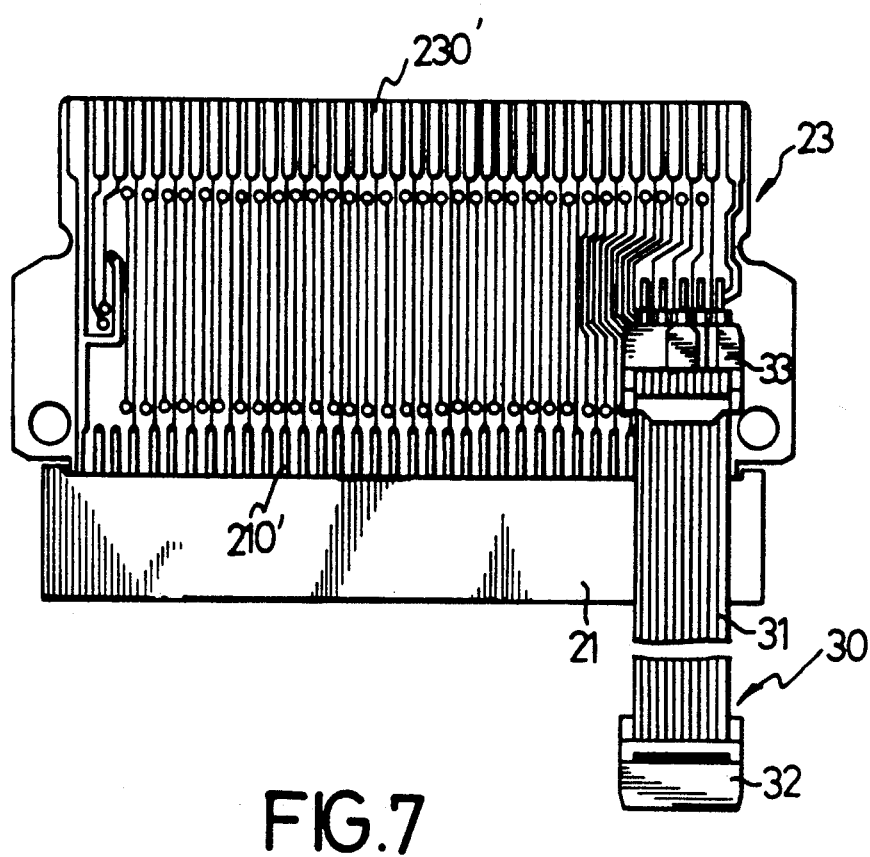
FIG. 7 is an opposite view of the dual side circuit board of FIG. 3.

Referring to FIGS. 3 and 1, a second circuit board 23 is physically and electrically connected to the second card socket 21. The second circuit board 23 is installed inside the second casing body 200 and the second card socket 21 extends from the front opening of the second casing body 200 as shown in FIG. 1. Referring to FIG. 3 again, a plurality of conducting leads 230 are formed near the rear side of the second circuit board 23 for inserting into the main machine 50 (see FIG. 4). The second card socket 21 is similar to the first card socket 11 and the sectional view thereof can refer to the first card socket 11 in FIG. 5. A plurality of leads 210 are connected to the corresponding conducting pin holes of the second card socket 21, and has a one-by-one connection relation. A plurality of code signal leads 231 are arranged at the top right side of the second circuit board 23 for coupling the secret code signals from the code-including card 60 to the main machine 50. A plurality of conductor holes 24 are used to connect the first male socket 12 with the code signal leads 231 via the interconnecting means 30, thereby transmitting the secret code signal to the main machine 50. FIG. 7 illustrates the opposite side of the second circuit board 23 as seen in FIG. 3, where a plurality of leads 230' and 210' are respectively corresponding to leads 230 and 210, and each corresponding pair of leads in 210' and 210 are electrically connected by the second card socket 21, each corresponding pair of leads in 230' and 230 are electrically connected by a card socket (not shown) in the main machine 50. FIG. 7 also illustrates the one-by-one connection between leads 210' and 230'. The connection between the interconnecting means 30 and the second circuit board 23 is also shown in FIG. 7.

Referring to FIG. 7, the interconnecting means 30 comprises a female connector 32, a male connector 33, and a flat cable 31 connected therebetween. The female connector 32 is inserted to the first male socket 12 of the first circuit board 13. The male connector 33 is soldered on the conductor holes 24 of the second circuit board 23, thus electrically connected thereto. Therefore, the interconnecting means 30 can transmit the secret code signal from the code-including card 60 to the main machine 50.

Referring to FIG. 4, when the user wants to play a general video game card 40 on the main machine 50, he has to make sure the first slot means 10 and the second slot means 20 have been connected by the interconnecting means 30, after then he merely respectively inserts the code-including video game card 60 and the general video game card 40 into the second slot means 20 and further inserts the second slot means 20 into the main machine 50 as shown in the figure.

Referring to FIG. 5, the first casing body 100 has two arcuate portions 14 at two upper corners thereof for fixing the code-including video game card 60 therein.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A universal converter for non-exclusive cards of video game such that a general video game card (40) is allowed to be played in a specific main machine (50) for a specific code-including video game card (60) comprising a first slot means (10) for receiving a code-including video game card (60), a second slot means (20) for receiving a general video game card (40), and an interconnecting means (30) for coupling between the first slot means (10) and the second slot means (20);

said first slot means (10) comprising a first card socket (11) for receiving said code-including video game card (60), a first circuit board (13) electrically and physically connected to said first card socket (11), and a first male socket (12) physically and electrically connected to said first circuit board (13);

said second slot means (20) comprising a second casing body (200), an operating plate (22) fixed on said second casing body (200), a second circuit board (23) fixed inside said second casing body (200), a second card socket (21) electrically and physically connected to said second circuit board (23) and out of said second casing body (200) for receiving a general video game card (40);

said interconnecting means (30) comprising a female connector (32), a male connector (33), and a flat cable (31) connected therebetween; said female connector (32) being electrically connected to said first male socket (12) of said first circuit board (13), said male connector (33) being electrically connected to said second circuit board (23), thereby transmitting said secret code signal from said code-including card (60) to said main machine (50).

2. A universal converter for non-exclusive cards of video game as claimed in claim 1, wherein said operating plate (22) comprises a third opening (220) which has a right recess (221) and a left recess (222) allowing a user to pull said second slot means (20) to electrically disconnect from said main machine (50) and a block (26) protruding from said operating plate 22 just behind said third opening 220 allowing the user to push said second slot means (20) to electrically connect to said main machine (50).

3. A universal converter for non-exclusive cards of video game as claimed in claim 1, wherein said block (26) has a slant face (260) for preventing said second slot means (20) inserting too far into said main machine (50).

* * * * *